United States Patent [19]

Porsche et al.

[11] Patent Number: 5,764,336
[45] Date of Patent: Jun. 9, 1998

[54] EYEWEAR TEMPLE CRANK MECHANISM

[75] Inventors: Ferdinand Alexander Porsche, Gries/St. Georgen; Jörg Tragatschnig, Zell am See, both of Austria

[73] Assignee: Bausch & Lomb Incorporated, Rochester, N.Y.

[21] Appl. No.: 804,240

[22] Filed: Feb. 20, 1997

[51] Int. Cl.[6] .................. G02C 5/00; G02C 5/22; G02C 5/08

[52] U.S. Cl. .................. 351/140; 351/153; 351/63; 2/453; 16/228

[58] Field of Search .................. 351/153, 140, 351/143, 158, 152, 63; 2/453; 16/228

[56] References Cited

U.S. PATENT DOCUMENTS

| | | | |
|---|---|---|---|
| 3,713,732 | 1/1973 | Gooch | 351/153 |
| 5,028,126 | 7/1991 | Takeuchi | 351/63 |

*Primary Examiner*—Huy Mai
*Attorney, Agent, or Firm*—Craig E. Larson; Katherine McGuire

[57] ABSTRACT

A crank mechanism for eyewear comprises a rigid, elongated member which extends across the front frame of the eyewear. Opposite ends of the crank mechanism pivotally connect to the front ends of the right and left temple members, respectively, and operates to move the temple members between their open and folded positions simultaneously with each other.

8 Claims, 4 Drawing Sheets

EYEWEAR TEMPLE CRANK MECHANISM

BACKGROUND OF THE INVENTION

The present invention relates to eyewear frame constructions, and more particularly relates to a crank mechanism allowing for simultaneous pivotal movement of the temple members on the eyewear with respect to the front frame.

Conventional eyewear styles (including spectacles, sunglasses, safety glasses, etc.) basically comprise a front frame for holding one or more lenses in front of the eyes and a pair of temple members each pivotally connected via a hinge to either end of the front frame to support the eyewear on the head. Although there are many different examples of hinge constructions for pivotally connecting temple members to eyewear fronts, all known hinge constructions operate independently of each other on the eyewear frame such that one temple member is pivotally movable independent of the other temple member. Thus, a user opens and folds the temple members one at a time with respect to the front frame. Should the user have only a single hand available to handle the eyewear, the user will typically grasp the eyewear by one temple, thereby unfolding it, and then "shake" the other temple open. When folding the eyewear, instead of shaking the eyewear, the user will typically press the other temple against a stationary object to force the temple closed. Both of these motions can, of course, impart damaging stresses upon the eyewear thereby reducing its wearable lifetime.

SUMMARY OF THE INVENTION

The present invention addresses the above problem in conventional eyewear hinge designs by providing a crank mechanism which interconnects the temple members at their hinge connections such that the pivotal movement of one temple member causes the simultaneous pivotal movement of the other temple member. More particularly, the crank mechanism is an elongated, rigid member which extends across the front frame. If desired, the front frame can be designed to conceal the crank member from normal view. Each temple member is pivotally connected to opposite sides of the front frame via a hinge screw or other known hinge means. The placement of the pivotal connection of the temple members at the forward ends thereof are different, however, with the pivotal connection of one the temple members lying closely adjacent the inner edge of the temple member, and the pivotal connection of the other temple member lying closely adjacent the outer edge of that temple member.

The crank mechanism is elongated as stated above and includes first and second, opposite end portions. The crank mechanism is positioned to extend across the front frame in the vicinity of the brow with the first and second end portions thereof connecting to the first and second temple members adjacent the front end portions thereof, respectively. The end portions of the crank mechanism pivotally connect to each of the first and second temple members, respectively, with one of the crank end portions being connected rearwardly of the pivotal connection of its respective temple member, and the other crank end portion being connected forwardly of the pivotal connection of its respective temple member. There are thus a two separate pivotal connections established at the forward end of each temple member. The respective placements of the pivotal connections of the temple members to the front frame and the pivotal connections of the crank mechanism to the temple members provide the necessary interconnection between the temple members which provides for the automatic, simultaneous movement of the second temple member upon manually opening or folding the first temple member on the eyewear frame.

DETAILED DESCRIPTION

Figure 1:
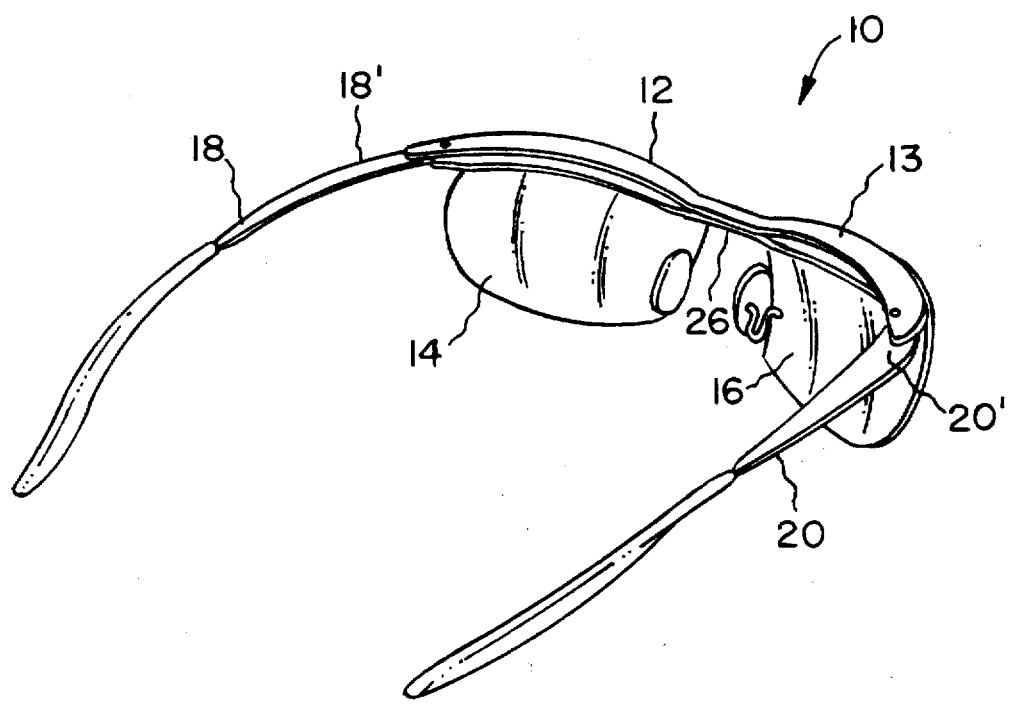
FIG. 1 is a rear perspective view of an eyewear embodying the present invention.

Referring to the drawing, there is seen in FIG. 1 an eyewear designated generally by the reference numeral 10 having a front frame 12 comprising a brow bar 13 holding a pair of lenses 14,16, and first and second temple portions 18,20 pivotally connected at the forward end portions 18',20' thereof to brow bar 13. As seen best in FIG. 2, the pivotal connection of the temple members to brow bar 13 are established by barrel and screw sets 19,19' and 21,21' which pass through aligned holes 19,21 and 23,25 formed in brow bar 13 and temple members 18,20, respectively, although other known hinge means may be used if desired. Brow bar 22 to which lenses 14,16 attach via rivets 24, for example, is set forth herein for purposes of description only, it being understood that front frame 12 may be of any desired construction and style, and the present invention is therefore not limited to the particular front frame construction shown and described herein.

The invention basically comprises a crank mechanism allowing for the simultaneous pivotal movement of the temple members. As seen best in FIG. 2, the crank mechanism 26 is formed as an elongated, rigid member which has opposite first and second end portions 28,30 which are pivotally connected to first and second temple members 18,20 at the forward ends 18',20' thereof, respectively. In the preferred embodiment, the pivot connections for the crank are formed by a pair of bosses 28',30' projecting from the end portions 28,30 thereof, respectively, which bosses 28', 30' engage a pair of slightly larger sized holes 32,40 formed through the forward ends 18',20' of temple members 18,20, respectively. Other forms of pivotal connections are of course possible (e.g., a hinge screw). The crank mechanism is assembled by first passing bosses 28',30' through holes 32,40 in temple members 18,20, respectively, and then sliding the assembled crank mechanism and temple members between the spaced wall portions 13',13" formed at opposite ends of brow bar 13.

A total of four pivot points (labeled A–D in FIGS. 2–5) are thus established at the hinge areas of the eyewear; first and second pivot points A,B established by screw sets 15,15' and 17,17', and third and fourth pivot points C,D established by bosses 28',30' at crank end portions 28,30, respectively. The relative positioning of the four pivot points A–D assist the proper functioning of the crank mechanism. As seen, pivot points A and C are reversed with respect to pivot points B and D at the opposite side of brow bar 13. More particularly, referring to FIG. 2, it is seen that hole 21, which establishes pivot point A, lies adjacent the inner side edge 18''' of temple member 18, while hole 25, which establishes pivot point B, lies adjacent the outer side edge 20'' of temple member 20. Also, hole 32, which establishes pivot point C, lies forwardly of hole 21 adjacent outer side edge 18'' of temple member 18, while hole 40, which establishes pivot point D, lies rearwardly of hole 25 adjacent inner side edge 20''' of temple member 20. The preferred distance between pivot points A and C on temple member 18 and between pivot points B and D on temple member 20 are as shown in the drawing figures; however, these distances may be adjusted either way depending on the eyewear style and desires of the eyewear designer. It is noted that as the these pivot points are moved closer to each other, the more difficult it will become to move the temple members between their open and folded positions. Likewise, as these pivot points are moved further away from each other, the easier it will be to move the temple members, however, moving the pivot points further apart may also cause more of the crank mechanism 26 to become visible from the front which may not be desirable. The distance between pivot points must therefore be adjusted to provide the right amount of opening and closing force required to move the temple members on the one hand, and concealing of the crank mechanism on the other hand. It is envisioned, however, that a designer may wish the crank mechanism to be formed and placed so as to be visual and form part of the aesthetic quality of the particular eyewear style at hand.

Figure 2:
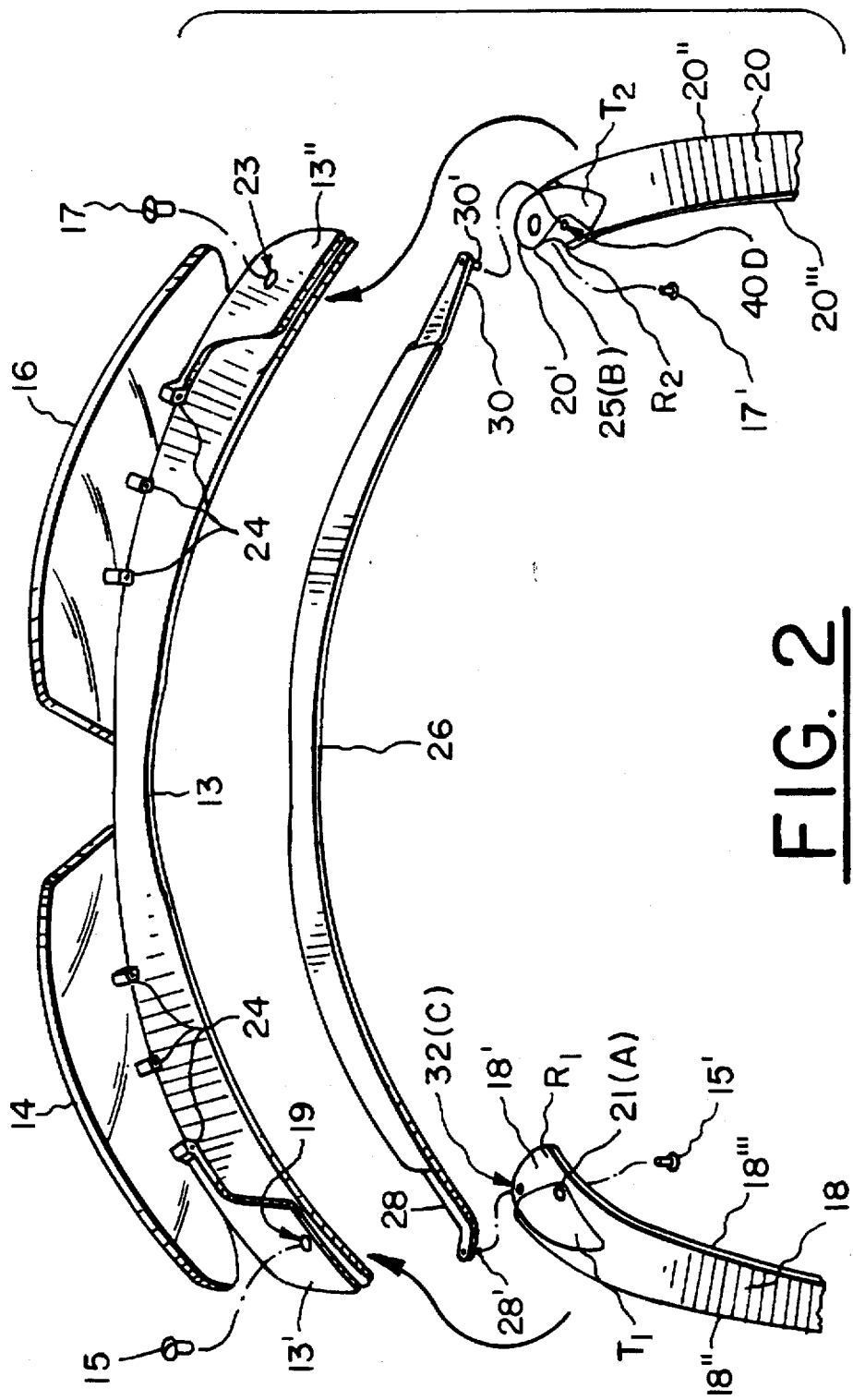
FIG. 2 is a bottom perspective, exploded view of the eyewear showing details of the inventive crank mechanism with the temple members fragmented.
Figure 3:
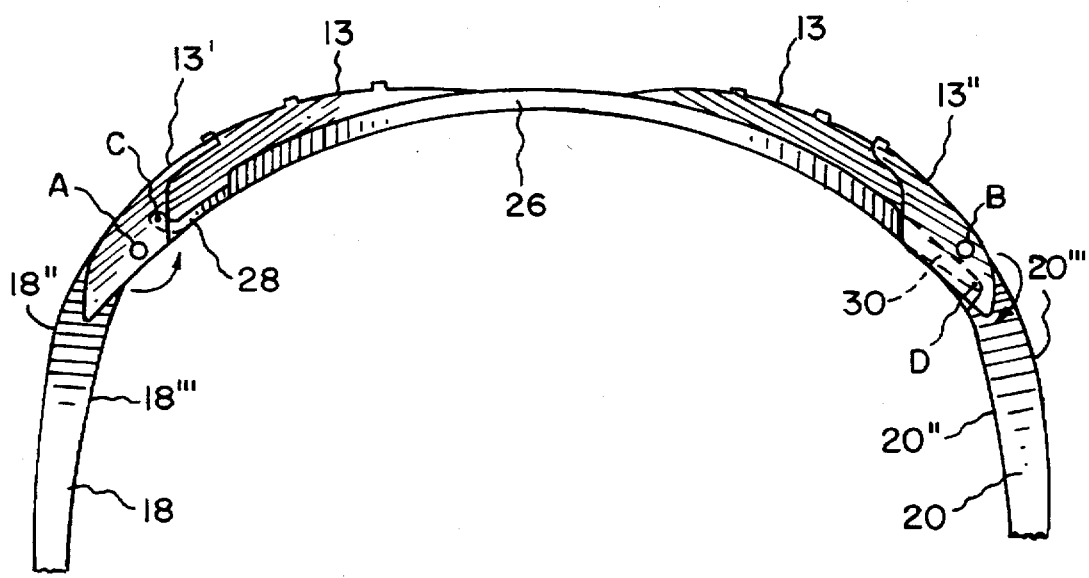
FIG. 3 is a bottom plan view, partly fragmented and selected parts broken away, of the crank mechanism of the present invention.

Referring still to FIG. 2, end portions 18',20' of temple members 18,20 include reliefs $R_1$ and $R_2$ wherein holes 32 and 40 are formed, respectively, so as to provide the necessary clearance for crank mechanism end portions 28,30 and temple members 18,20 between brow bar wall portions 13',13''. Additionally, the areas of end portion 18',20' surrounding reliefs $R_1$ and $R_2$ are provided with pads $T_1$ and $T_2$ formed of a low-friction material (e.g., TEFLON®) to decrease friction between these moving parts.

Figure 5:
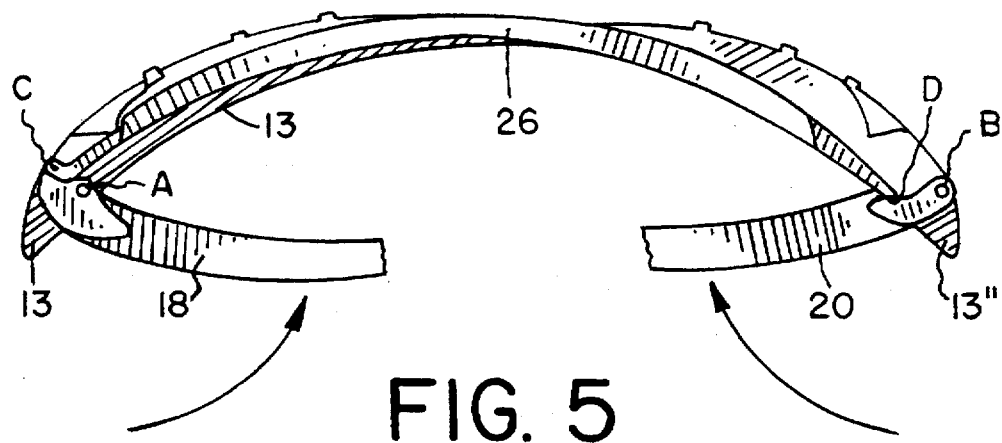
FIG. 5 is a bottom plan view of the crank mechanism showing the temple members in their folded positions.
Figure 4:
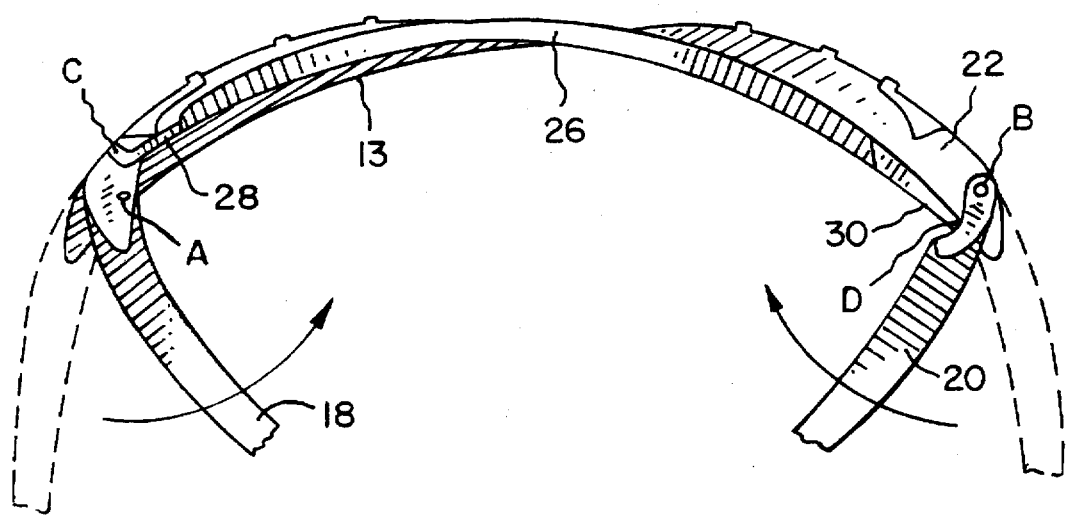
FIG. 4 is a bottom plan view of the crank mechanism showing the temple members being moved to their folded position.

Referring to the fully assembled views of the eyewear 10 in FIGS. 1 and 3-5, it is seen that crank mechanism 13 is curved to follow the same general curvature of brow bar 13 and extends completely across front frame 12 beneath and generally parallel to brow bar 13. As such, crank mechanism 26 is substantially hidden when viewing the eyewear from the front (this view not shown). As stated above, however, other eyewear front frame constructions and styles are possible and within the scope of this invention. During operation, crank mechanism 26 slides to the right and left with respect to brow bar 13. More particularly, as seen in FIGS. 4 and 5, folding of one temple member causes the simultaneous folding of the other temple member through the action of crank mechanism 26. Thus, as temple member 18 is moved in the direction of the arrow toward a folded position, temple member 18 pivots about pivot point A causing pivot point C to move in the counter-clockwise direction. This movement of pivot point C pulls crank mechanism end portion 28 to the left, thereby causing crank mechanism end portion 30 to pull temple member 20 and pivot point D in the opposite, clock-wise direction which hence rotates temple member 20 about pivot point B in the direction of the arrow also toward the folded position. It is of course obvious that it does not matter which temple member 18 or 20 is manually folded and closed; the other temple member will move simultaneously with it through the push-pull action of crank mechanism 26. Also, crank mechanism 26 operates in the reverse direction to open temple members 18,20 from the folded position to the open position, i.e., as temple member 20 is manually opened, it rotates about pivot point B with pivot point D thus moving to the right in the counter-clockwise direction, thus causing crank mechanism 26 to move to the right also, pulling end 28 and pivot point C to the left in the clock-wise direction, and thereby causing temple member 18 to move in the clock-wise direction to the open position.

The materials from which the eyewear components are formed may vary; however, in the preferred embodiment, crank mechanism 26 is formed of titanium or titanium alloy while brow bar 13 and temple members 18,20 are formed of aluminum.

What is claimed is:

1. In an eyewear having a front frame and first and second temple members each pivotally connected to opposite sides of said front frame, the improvement comprising a crank mechanism having opposite first and second end portions pivotally connected to said first and second temple members, respectively, said crank mechanism being operable to simultaneously pivot said second temple member upon pivoting said first temple member with respect to said eyewear front frame.

2. The eyewear of claim 1, wherein the pivotal connections of said first and second temple members to said front frame establish first and second pivot points, and the pivotal connections of said first and second end portions of said crank mechanism to said first and second temple members establish third and fourth pivot points on said eyewear frame.

3. The eyewear of claim 2 wherein said first and second temple members each have an inner and outer side edge and wherein said first and second pivot points lie adjacent opposite side edges of a respective said temple member.

4. The eyewear of claim 3 wherein said third pivot point lies forwardly of said first pivot point and said fourth pivot point lies rearwardly of said second pivot point.

5. The eyewear of claim 4 wherein said eyewear front frame includes a brow bar and said crank mechanism extends across said front frame adjacent said brow bar.

6. The eyewear of claim 5 wherein said crank mechanism is curved.

7. The eyewear of claim 6 wherein said third and fourth pivot points are established by a pair of bosses on said temple members and a pair of holes formed in said ends of said crank mechanism which extend over said bosses on said temple members, respectively.

8. The eyewear of claim 7 wherein said first and second temple members each have a front end, and further comprising a pair of low friction pads mounted on said front ends of said temple members.

* * * * *